(12) United States Patent
Sato (10) Patent No.: US 7,670,118 B2
(45) Date of Patent: Mar. 2, 2010

(54) HOT GAS BLOWING FAN

(75) Inventor: Kimihiko Sato, Kanagawa (JP)

(73) Assignee: Cap Co., Ltd., Yokohama-shi (JP)

( * ) Notice: Subject to any disclaimer, the term of this patent is extended or adjusted under 35 U.S.C. 154(b) by 650 days.

(21) Appl. No.: 10/544,181

(22) PCT Filed: Feb. 3, 2004

(86) PCT No.: PCT/JP2004/001040

§ 371 (c)(1),
(2), (4) Date: Aug. 2, 2005

(87) PCT Pub. No.: WO2004/070209

PCT Pub. Date: Aug. 19, 2004

(65) Prior Publication Data

US 2006/0144387 A1  Jul. 6, 2006

(30) Foreign Application Priority Data

Feb. 3, 2003 (JP) .............................. 2003-026542

(51) Int. Cl.
*F04D 7/06* (2006.01)
*F04B 17/03* (2006.01)
(52) U.S. Cl. ................ 417/420; 417/423.8; 417/423.11
(58) Field of Classification Search ................ 417/423.8
See application file for complete search history.

(56) References Cited

U.S. PATENT DOCUMENTS 2,746,684 A * 5/1956 Fabares et al. ............. 236/44 A
4,815,418 A * 3/1989 Maeda et al. ................ 122/4 D
5,076,590 A * 12/1991 Steinetz et al. .............. 277/355
5,108,715 A * 4/1992 Jekat et al. .................. 422/159
5,334,004 A * 8/1994 Lefevre et al. .............. 417/420

FOREIGN PATENT DOCUMENTS

JP    1-249999     10/1989
JP    2000-35191    2/2000
JP    2003-31244    1/2003

OTHER PUBLICATIONS

"Hydraulic Losses in Pipes and Ducts", Japan Society of Mechanical Engineers, p. 169-170, 1979.

* cited by examiner

*Primary Examiner*—Devon C Kramer
*Assistant Examiner*—Philip Stimpert
(74) *Attorney, Agent, or Firm*—Oblon, Spivak, McClelland, Maier & Neustadt, L.L.P.

(57) ABSTRACT

A hot-gas blowing fan includes a heat resisting impeller, a bearing, a heat insulting layer, a cooling portion, first and second magnetic couplings, a non-magnetic partition wall, and a collar. The heat insulating layer is disposed between the impeller and the bearing. The impeller and bearing are attached to the rotating shaft. The cooling portion is disposed between the heat insulating layer and the bearing. The cooling portion includes a cooling fluid that does not contact the bearing or the rotating shaft. The collar is positioned between the heat insulating layer and the impeller and is positioned between the heat insulating layer and the rotating shaft. The collar is made of a different material than the heat insulating layer.

14 Claims, 7 Drawing Sheets

HOT GAS BLOWING FAN

TECHNICAL FIELD

The present invention relates to a hot-gas blowing fan applicable mainly to a solid oxide fuel cell.

BACKGROUND ART

For various kinds of furnace for heating or firing, a hot-gas blowing fan is in some cases used for circulating or agitating the gas in the furnace to homogenize the temperature in the furnace and improve the heating efficiency.

In a solid oxide fuel cell, the working temperature for power generation is from 700 to 1,000° C. Therefore, hydrogen and fuel gas such as natural gas or coal gas as a supply source of carbon oxide, which become fuel, are heated to from 700 to 1,000° C. before supplying them to the fuel electrode of the fuel cell.

In this case, it is reported to use a so-called steam reformation method wherein the hot fuel gas and steam are reacted to produce pure hydrogen according to the following formula, before supplying them to the fuel electrode. This method improves the reaction efficiency of the fuel gas and increases power generation efficiency in comparison with a method that the fuel gas is straightly fed to the fuel electrode for reaction.

(Reaction formula of the steam reformation) $CH_4 + 2H_2O \rightarrow CO_2 + 4H_2$ In order to carry out the steam reformation of the fuel gas, it is necessary to humidify the fuel gas. However, when the humidification is carried out by using water for industrial use or domestic use, impurities contained in the water contaminate or corrode the main body of the fuel cell, so that a significant negative impact is on the performance and durability of the fuel cell main body. Further, an attempt to install an equipment for removing completely the impurities in the water supply line was questionable in view of the installation space and initial investment, and therefore, was not realistic.

In the solid oxide fuel cell, water is produced as a reaction product by hydrogen and oxygen at the side of the fuel electrode to which a fuel gas is supplied. Namely, at the same time that the fuel gas supplied toward the fuel electrode reacts at the fuel electrode, it is humidified with the produced water. The produced water does not contain impurities. Accordingly, if the humidified fuel gas can be circulated for reuse, the steam reformation of a fuel gas by the humidification becomes possible before the reaction, whereby the power generation efficiency can be increased.

Further, for the fuel gas heated to from 700 to 1,000° C. to be supplied to the fuel electrode, it is impossible that hydrogen and carbon oxide as reactive gases can be reacted entirely in only once contact with the fuel electrode. By circulating the fuel gas for reusing, the fuel gas can be used effectively and the sensible heat of the fuel can be reused, whereby the power generation efficiency can be increased in this point also.

From the reason described above, the technique of using a hot-gas blowing fan for a solid oxide fuel cell to circulate a hot fuel gas has been studied intensively.

On the other hand, there can be considered to provide a structure that the temperature of a hot fuel gas is decreased to about 100° C. by means of a heat exchanger, and when the temperature is not more than 100° C., the fuel gas is pressurized with an ordinarily available fan, and then the fuel gas is heated again to a working temperature of from 700 to 1,000° C. However, the idea of this structure was no realistic at all when the problems of heat loss, the cost of the heat exchanger and the installation space were considered.

When the hot-gas blowing fan is applied to the solid oxide fuel cell, the following conditions should be satisfied.

1) Since a hot fuel gas is combustible and is deadly to human being depending on a fuel cell used, the hot fuel gas must not be leaked outside the system. Namely, the shaft sealing device for the rotating shaft connecting the motor with the impeller comprising rotary vanes and a disk should be completely gas-tight.

2) Since there is a case that the fuel cell is used as a dispersed power source in out-country, and the fuel cell system itself should be simple, the utility should not be used other than a d.c. power source supplied from the fuel cell system itself. Further, the amount of electric power for the blowing fan should be not more than about 5% of the generated power.

3) The fuel cell is installed as a dispersed power source for usual houses and small-sized apartments. Accordingly, the blowing fan used should be compact.

4) The initial investment should be low. Specifically, it is desired to be not more than 3% of the sales price of the fuel cell system.

5) In order to prevent condensation of the hot fuel gas, the temperature of the part exposed to the hot fuel gas should be always at least the dew-point temperature.

6) In order to prevent the breakage or deformation of the impeller, there should not be any danger of collision of a foreign matter having a size by which the breakage or deformation of the impeller during the rotation may cause.

As described above, from the viewpoints of safeness and economy, it is important for the solid oxide fuel cell that the hot fuel gas should not be leaked outside the system.

As the shaft sealing method for the hot-gas blowing fan, which has conventionally been utilized, there is a method that a first shaft sealing device is inserted on the rotating shaft at a position between a bearing and a cooling portion provided between an insulating layer and the bearing, and a second shaft sealing device is inserted on the rotating shaft at a position between a second bearing disposed at a low-temperature side of the rotating shaft and a shaft coupling disposed at the end of the rotating shaft, this method being generally utilized. As the first and/or second shaft sealing device, a gland packing, an oil seal, an O-ring, a labyrinth, a mechanical seal or the like is used.

Among these shaft sealing devices, the gland packing, the oil seal and the O-ring are made of rubber or a synthetic resin. Accordingly, these elements are sensitive to gas quality and temperature, and therefore, the service life can not be expected beyond several years. Especially, the solid oxide fuel cell has strong reducing properties because the hot fuel gas as fuel contains hydrogen and carbon oxide. Accordingly, the sealing technique using rubber or a synthetic resin is less reliability.

For the labyrinth or the mechanical seal, a purge gas is used to always push it in order to prevent a process gas sealed inside from leaking outside. In this case, the mixing of the purge gas with the process gas is unavoidable. For the solid oxide fuel cell, it is very important that the process gas should be pure for the performance of the fuel cell, and the mixing of the purge gas is generally impermissible. In case of using a purge gas for the solid oxide fuel cell, an inert gas such as nitrogen, helium or the like being expensive can be considered. However, the cost of the utility would thereby increase, with the result of an increase of cost per unit power. Further, when the solid oxide fuel cell is used as a dispersed power source for a usual house and a small-sized apartment, there arise problems such as the space for the purge gas cylinder, safety control, re-supply and so on, such being unrealistic.

As described above, any shaft sealing device without using the utility other than the power source, being compact, simple and completely gas-tight has not actually been proposed.

A bearing is fitted to the rotating shaft to cantilever the impeller. The upper temperature limit for allowing use of the bearing for a long-term under good conditions would be about 100° C. in consideration of the restriction of the upper temperature limit of the lubricant such as grease used for lubricating the bearing. It is necessary to remove the flux of heat transferred from the impeller to the rotating shaft through the heat insulating layer disposed between the impeller and the bearing, whereby the bearing can be cooled to a predetermined temperature or lower. Here, the removal of heat means that the flux of heat is taken to discharge it.

In the hot-gas blowing fan conventionally used for removing heat, such a method is generally employed, wherein a water-cooling jacket is provided between the bearing and the impeller which is directly exposed to a hot gas, in coaxial with the rotating shaft and in contactless therewith while it is in direct contact with the outer ring of the bearing, a cooling water cooled to, for example, not more than 30° C. is supplied to the water-cooling jacket to maintain the surface temperature of the water-cooling jacket to, for example, not more than 50° C. whereby the rotating shaft is cooled by heat radiation, and the bearing is cooled by the heat transfer between the water-cooling jacket and the outer ring of the bearing. Further, such a method may be employed, wherein the lubricating oil cooled to, for example, not more than 30° C. is brought to direct contact with the rotating shaft and the bearing to remove the heat under lubrication.

However, the conventional cooling method required devices such as a pump for circulating water or a lubricating oil as a heat-removing medium, a cooling device for cooling the heat-removing medium and pipes for connecting these, with the result of bringing drawbacks of making the entire system complicated and hindering the reduction of the installation space. In particular, such were the major negative factors in introducing the solid oxide fuel cell as a dispersed power source for a usual house or a small-sized apartment.

In the solid oxide fuel cell using natural gas as the fuel, the dew-point of the fuel gas, i.e., the process gas is about 70° C. Accordingly, when the heat-removing medium such as water or a lubricating oil having a low temperature as above-mentioned was used, there caused super-cooling and there caused dew condensation on and near a cooling section such as the water-cooling jacket, so that there created a problem of causing the deterioration of the fuel cell main body due to corrosion derived from the condensation of moisture, and elution or scattering of a contaminant to thereby affect deadly the performance and durability of the fuel cell.

Further, since it was necessary to prevent the deterioration of the water or the lubricating oil as the heat-removing medium and to compensate the reduced amount thereof, a continuous, maintenance-free operation of, for example, 24 hours×365 days×3 years was considered to be difficult.

In addition, if the power source for a device such as a pump for circulating the heat-removing medium is stopped due to power stoppage, or the supply of the heat-removing medium is stopped due to a failure of the device itself, measures have to be taken so as to stop the heating of the hot gas by means of an electric control mechanism or the like. In such case, the shaft sealing device or the bearing may suffer a fatal damage by the heat of the hot gas of from 700 to 1,000° C. inside the device or the heat from the heat insulating material heated to have a high temperature.

Further, a method in which the rotating shaft and the bearing are cooled directly with use of a cooling fan can be considered, as one way of thinking, although the sealing structure for the method is not realistic. In this case, the heat transfer coefficient indicating the ability of removing heat, of water is from 1,000 to 3,000 w/m²K while that of air is far smaller, i.e. from 10 to 30 w/m²K. Accordingly, if air is used to obtain the same cooling effect as that by water, the surface area of the heat-removing portion should be about from 100 to 300 times as much as the case of using water, and it was in fact difficult to provide the heat-removing section in a limited space around the rotating shaft and the bearing.

When a hot-gas blowing fan is used for the solid oxide fuel cell, it is necessary to drive a small-sized impeller at a high speed, rather than driving a large-sized impeller at a low speed, to satisfy specifications such as wind volume, wind pressure and so on in view of restrictions such as cost and the installation space. However, if a foreign matter hits the impeller rotated at a high speed, the impeller may be broken or deformed.

For example, when an impeller made of silicon carbide is used to drive it at an impeller's circumferential velocity of 205 m/sec, the allowable particle size of foreign matter which does not cause the breakage of the impeller even in collision, is not more than 1 mm according to experiments. It means that it is necessary to provide a dust collector not to suck a foreign matter having a particle size of more than 1 mm from the inlet port of the scroll under the above-mentioned condition.

Conventionally, the purpose of use of the hot-gas blowing fan was fairly limited; in particular, it was unnecessary to consider the incoming of a foreign matter. Accordingly, a dust collector for a hot-gas blowing fan requiring a low cost and a small installation space has not actually existed.

From these reasons, it was difficult to provide the technique capable of satisfying the conditions to apply a hot-gas blowing fan to the above-mentioned solid oxide fuel cell.

It is an object of the present invention to solve the problems of the conventional techniques and to provide a hot-gas blowing fan suitable for a solid oxide fuel cell.

DISCLOSURE OF THE INVENTION

The present invention is to achieve the above-mentioned object, and to provide the hot-gas blowing fan described below.

(1) A hot-gas blowing fan comprising a heat resisting impeller cantilevered by a rotating shaft, a bearing attached to the rotating shaft, a heat insulating layer disposed between the impeller and the bearing and a cooling portion disposed between the heat insulating layer and the bearing, wherein a first coupling to be mated with another magnetic coupling is disposed on the shaft end of the rotating shaft at the side opposite to the impeller and a non-magnetic partition wall is disposed between the first coupling and a second coupling to be mated with the first magnetic coupling is disposed on the shaft end of the driving shaft of a motor, whereby a space surrounding the rotating shaft is hermetically sealed from an outer field by the non-magnetic partition wall and a casing.

(2) The hot-gas blowing fan according to the above-mentioned (1), wherein an inert gas is filled in the hermetically sealed space.

(3) A hot-gas blowing fan comprising a heat resisting impeller cantilevered by a rotating shaft, a bearing attached to the rotating shaft, a heat insulating layer disposed between the impeller and the bearing, which further comprises an air cooling means comprising a heat receiving portion disposed between the heat insulating layer and the bearing, an air cooling/radiating portion provided at an outer side of a casing and a heat transporting portion connecting the heat receiving portion to the air cooling/radiating portion.

(4) The hot-gas blowing fan according to the above-mentioned (3), wherein the heat receiving portion and the heat transporting portion are unified to form a thermo-siphon heat pipe.

(5) The hot-gas blowing fan according to the above-mentioned (1), wherein the cooling portion is an air cooling means comprising a heat receiving portion disposed between the heat insulating layer and the bearing, an air cooling/radiating portion provided at an outer side of the casing and a heat transporting portion connecting the heat receiving portion to the air cooling/radiating portion.

(6) The hot-gas blowing fan according to any one of the above-mentioned (1) to (5), wherein an inertia dust collector is provided at the inlet port of a scroll.

(7) The hot-gas blowing fan according to any one of the above-mentioned (1) to (6), which is used for a solid oxide fuel cell.

EXPLANATION OF REFERENCE NUMERALS

1: Scroll, 2: Inlet port of scroll, 3: Impeller, 4: Discharge port of scroll, 5: Cooling portion, 6: Rotating shaft, 7: Bearing, 8: Outer heat retaining layer, 9: Fan shaft side magnetic coupling, 10: Motor shaft side magnetic coupling, 11: Non-magnetic partition wall, 12: Casing, 13: Fitting flange, 14: Cooling water supply side pipe, 15: Cooling water discharge side pipe, 16: Heat insulating layer, 17: Second bearing, 18: Permanent magnet located on fan shaft side magnetic coupling, 19: Permanent magnet located on motor shaft side magnetic coupling, 20: O-ring, 21: Backboard collar, 21$a$: Backboard, 21$b$: Collar, 22: Heat insulating spacer, 23: Motor, 24: Back-to-back duplex angular bearing, 25: Purge gas inlet, 26: Purge gas outlet, 27: Shaft sealing device, 28: Heat receiving portion, 29: Heat transporting portion, 30: Air cooling/radiating portion, 31: Cooling fan, 32: Fin, 33: Evaporative portion, 34: Heat transporting pipe, 35: Enclosed water, 36: Shielding, 37: Apertured portion, 38: Shielding supporter, 39: First shaft sealing device, 40: Second shaft sealing device, 41: Shaft coupling, 42: Purge gas inlet

BEST MODE FOR CARRYING OUT THE INVENTION

In the following, some embodiments of the present invention will be described with reference to the drawing.

Figure 1:
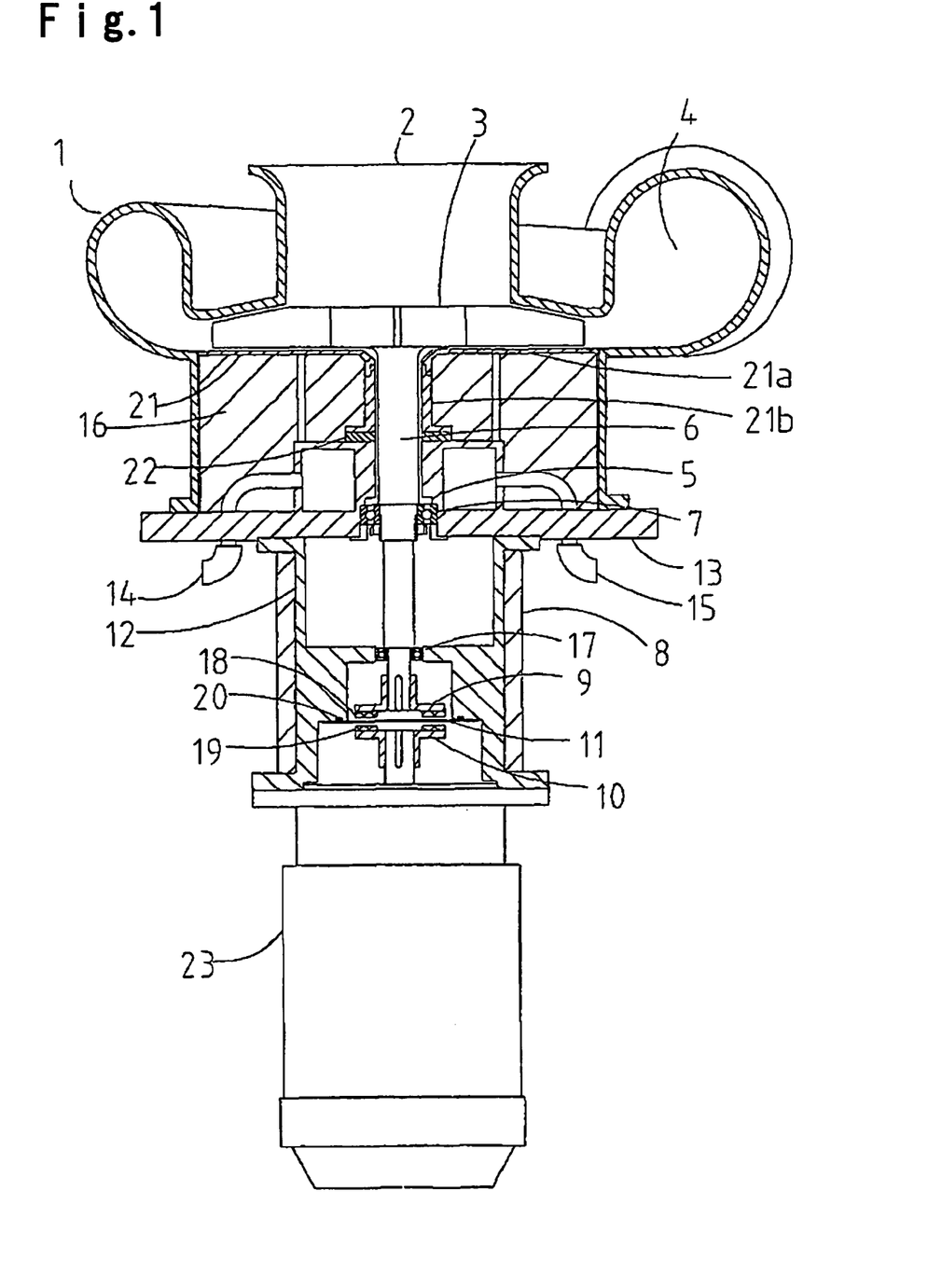
FIG. 1 is a cross-sectional view of a side of the hot-gas blowing fan according to an embodiment of the present invention.

FIG. 1 is a cross-sectional view of a side of the hot-gas blowing fan according to an embodiment of the present invention wherein reference numeral 1 designates a scroll, 2 an inlet port of scroll, 3 an impeller, 4 a discharge port of scroll, 5 a cooling portion, 6 a rotating shaft, 7 a bearing, 8 an outer heat retaining layer, 9 a fan shaft side magnetic coupling, 10 a motor shaft side magnetic coupling, 11 a non-magnetic partition wall, 12 a casing, 13 a fitting flange, 14 a cooling water supply side pipe, 15 a cooling water discharge side pipe, 16 a heat insulating layer, 17 a second bearing, 18 a permanent magnet located on the fan shaft side coupling 9, 19 a permanent magnet located on the water shaft side magnetic coupling 10 so as to face the permanent magnet 18 located on the fan shaft side coupling 9, 20 an O-ring, 21 a backboard collar, 21$a$ a backboard, 21$b$ a collar, 22 a heat insulating spacer and 23 a motor, respectively.

In FIG. 1, a hot-gas is sucked through the inlet port 2 of the scroll 1, the pressure of the hot-gas is increased by the revolution of the impeller 3 comprising rotary vanes and a disk and the gas is discharged through the discharge port 4. Accordingly, the temperature of the impeller 3 reaches a temperature level of, for example, 700° C. or higher which is equal to the temperature of the hot-gas. Such a high revolution under a high temperature creates a large centrifugal stress at, in particular, the root of the rotary vanes of the impeller 3.

Further, since the hot fuel gas as a hot gas used for a solid oxide fuel cell contains 30 to 50% of water vapor in volume ratio, care to deterioration of the strength of the materials due to oxidation by hot water vapor has to be taken.

Accordingly, the impeller 3 in direct contact with the hot gas or the impeller 3 and the rotating shaft 6 have to be made of a material having a sufficient strength in a high temperature atmosphere and being excellent in durability to oxidation by hot water vapor. In this embodiment, Incoloy (trademark) 800H being a Fe—Ni—Cr alloy is employed for the impeller 3 and the rotating shaft 6. However, a Ni—Cr—Co alloy or the like is sometimes used. More preferably, a ceramic material such as silicon carbide, silicon nitride, sialon or the like having a density of not more than 10% in porosity may be employed.

The cooling portion 5 is a water-cooling jacket in this embodiment and is disposed in a state of being coaxial with the rotating shaft 6 and further in a state of contacting directly to the outer ring of the bearing 7. In this embodiment, cooling water cooled to, for example, 70° C. is supplied to the water-cooling jacket to maintain the surface temperature of the water-cooling jacket to be, for example, 80° C. which is higher than 70° C. as the dew-point of the hot gas whereby the rotating shaft 6 is cooled by a radiation effect and the bearing 7 is cooled by heat conduction. Accordingly, the dew condensation does not take place at the inside and the bearing 7 can be kept to the permissive temperature or lower whereby the hot-gas blowing fan can stably be used for a long time. It is preferred that the temperature of the supplied cooling water is higher than the temperature of the dew-point of a process gas in operation, more preferably, the temperature of the supplied cooling water is determined at least 5° C. higher than the temperature of the dew-point of the process gas in operation. Further, in this embodiment, the rotating shaft 6 extends vertically; the impeller 3 is disposed in an upper portion of the shaft and the motor 23 is disposed at a lower portion thereof. Accordingly, there is a case that bubbles remain in an upper portion of the cooling water conduit of the water-cooling jacket whereby the cooling power at the bubble-remaining portion decreases. Therefore, means for removing bubbles are disposed in an upper portion of the cooling water conduit although not shown.

The cooling water is circulated by means of a pump (not shown) and is cooled to 70° C. by means of a cooling device (not shown).

The backboard collar 21 comprises a backboard 21a covering the rear surface of the rotating portion of the impeller 3 and a collar 21b disposed in coaxial with the rotating shaft 6 and in non-contact therewith. The backboard 21a and the collar 21b are jointed each other by means of socket and spigot joint or the like and a centering device (not shown) so that they can be thermally expanded while their common center can be maintained. The backboard 21a forms the flow path of hot gas inside the hot-gas blowing fan in association with the scroll 1. As the material for the heat insulating layer 16, ceramic fibers or the like are used. On the other hand, the backboard collar 21 prevents ceramics fibers from scattering into the flow path of hot gas. As shown in FIG. 1, there is no seal positioned between the impeller 3 and the bearing 7 to prevent gas in the hot flow path from traveling from the impeller 3 to the bearing 7. The backboard collar 21 is fixed to the cooling portion 5 by interposing the heat insulating spacer 22 therebetween. The backboard 21a contacts directly the hot gas whereby it has the same temperature level as the hot gas. The collar 21b is formed integrally with the backboard 21a and the presence of the heat insulating spacer 22 between the collar 21b and the cooling portion 5 blocks the cooling effect from the cooling portion 5. Accordingly, the collar 21b has a temperature level near the temperature of the backboard 21a. Thus, the thermal deformation due to a temperature difference between the backboard 21a and the collar 21b can be prevented and at the same time, the thermal loss of the fuel cell system can be reduced.

As the material for the backboard 21a and the collar 21b, stainless steel, heat-resistant cast steel or ceramics having a sufficient strength at a high temperature and durability to oxidation by hot water vapor may be used. In this embodiment, SUS316 is used. As the material for the heat insulating spacer 22, ceramics of low heat conduction such as Codilite, aluminum titanate may be used. In this embodiment, Codilite is used. Further, it is possible that the collar 21b is made of the low thermal conduction ceramic to perform the function of the heat insulating spacer 22.

A fan shaft side magnetic coupling 9 as a first coupling to be mated with another magnetic coupling is attached to the shaft end of the rotating shaft 6 at the opposite side of the impeller 3. A motor shaft side magnetic coupling 10 as a second coupling is attached to the shaft end of the motor shaft so as to face the first coupling. Between the fan shaft side magnetic coupling 9 and the motor shaft side magnetic coupling 10, a clearance of from about 3 to 10 mm is provided, the clearance being determined from the relation between the magnetic force and the torque transmission. In the clearance, a non-magnetic partition wall 11 of non-air-permeability made of a material such as plastic, non-magnetic ceramic, Bakelite or the like is disposed, and a sealing material such as an O-ring 20, a gasket or the like is disposed at a contact portion of the casing 12 and the non-magnetic partition wall 11. The casing 12 mentioned herein is a structural body supporting the second bearing 17 and the non-magnetic partition wall 11. However, the casing in the present invention includes a structural body covering the cooling portion 5 and a heat receiving portion 28 (see FIG. 4) which will be described hereinafter. The casing 12 and the fitting flange 13, and the scroll 1 and the fitting flange 13 have respectively flange connection, and a sealing material such as an O-ring, a gasket or the like is provided in each connection surface although they are not shown in the drawing. Sealing devices (not shown) are also provided between the cooling water supply side pipe 14 and the fitting flange 13 and between the cooling water discharge side pipe 15 and the fitting flange 13. For the permanent magnet 18 used for the fan shaft side magnetic coupling 9 and the permanent magnet 19 used for the motor shaft side magnetic coupling 10, a rare earth-cobalt magnet is preferably used because of its having excellent heat stability and corrosion resistivity.

With the above-mentioned structure, an enclosed space is formed by the combination of the casing 12 and the non-magnetic partition wall 11. The sealing portion in the enclosed space is provided by the casing 12 and the non-magnetic partition wall 11 as fixed parts, and the sealing portion is cooled sufficiently in terms of temperature. Accordingly, a completely gas-tight seal is possible with an inexpensive sealing material such as an O-ring, a gasket, a liquid gasket or the like.

Namely, since the enclosed space can be formed by the casing 12 and the non-magnetic partition wall 11, the hot-gas blowing fan is in a completely gas-tight state with respect to an outer ambient atmosphere without using a purge gas.

When the hot gas is combustible, the hot combustible gas invades into the enclosed space to mix with air in the enclosed space. In this embodiment, the volume of the enclosed space is designed so that even if combustion occurs, the amount of generated heat is sufficiently small in comparison with the heat discharged to the surroundings. If the pressure of a hot combustible gas becomes lower than the pressure of the enclosed space due to any cause, there is a possibility that air in the enclosed space leaks outside during the process whereby a local combustion or a slight contamination of the hot combustible gas takes place. However, it can be handled sufficiently by minimizing the volume of the enclosed space.

In applying the hot-gas blowing fan to a solid oxide fuel cell, when the process is to be stopped, the heating of a hot fuel gas as the process gas heated to from 700 to 1,000° C. during operation is stopped to decrease the temperature. In this case, since the process gas has a large heat capacity, the temperature decreases gradually, and since the internal gas is substituted with non-condensable nitrogen or air, no condensation of moisture takes place. When design is made so that the casing 12 is exposed to ambient air, the temperature of the entire casing decreases rapidly because the casing 12 has a small heat capacity whereby the temperature of the remained process gas containing water vapor difficult to be substituted in the enclosed space decreases also rapidly. The outer heat retaining layer 8 lined on the outer wall of the casing is provided to eliminate such trouble. Namely, the outer heat retaining layer 8 made of a heat insulating material such as ceramic fibers is mounted on the outer periphery of the casing 12 to prevent the casing from rapid cooling due to the ambient air. Accordingly, there is little possibility of condensation of moisture in the enclosed space.

Figure 2:
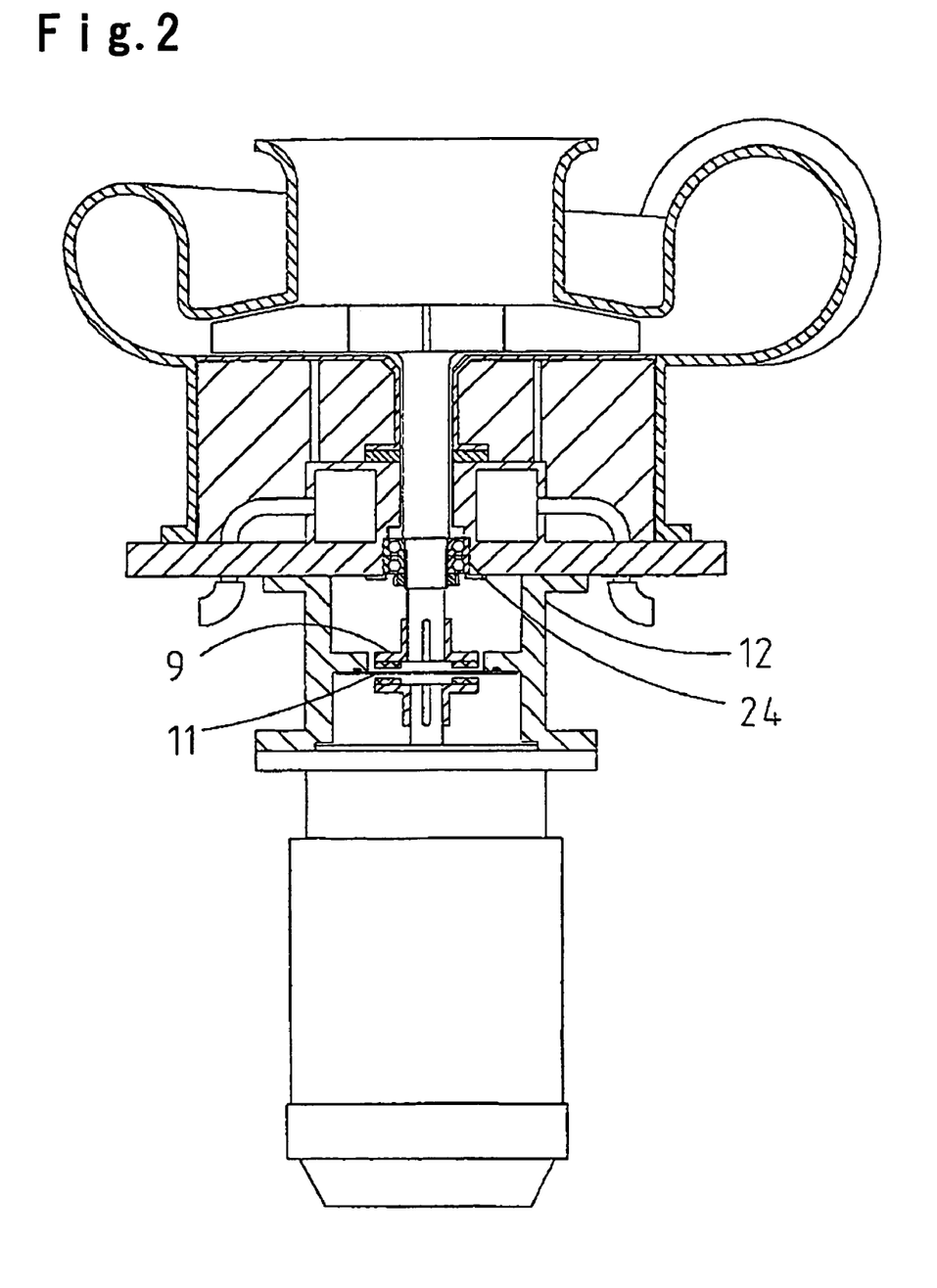
FIG. 2 is a cross-sectional view of a side of the hot-gas blowing fan according to a second embodiment of the present invention.

FIG. 2 is a cross-sectional view taken along a side plane of a second embodiment of the present invention wherein the second bearing 17 in FIG. 1 is omitted and the bearing 7 is replaced by a back-to-back duplex angular bearing 24. On the same parts as in FIG. 1, which are not referred to in this embodiment, those reference numerals are omitted.

The back-to-back duplex angular bearing 24 comprises a set of bearings by which an axial load in either direction, a radial load and a moment load can be received simultaneously. Accordingly, the second bearing is unnecessary. In this embodiment, the distance between the back-to-back duplex angular bearing 24 and the fan shaft side magnetic coupling 9 is made shorter and the volume of the enclosed space formed by the non-magnetic partition wall 11 and the casing 12 can significantly be reduced as shown in FIG. 2. The enclosed space having a smaller volume provides the following advantage. Namely, even when the hot combustible gas invades into the enclosed space to mix with the remaining air in the enclosed space, and in such case, even though combustion takes place, instantaneous heat dissipation occurs because the calorific value is small. Accordingly, a problematic increase of inner pressure does not occur. Further, requirements for reducing the size and the cost, which are particularly important for the solid oxide fuel cell system, can be met. The back-to-back duplex angular bearing 24 may be a double row angular bearing.

Figure 3:
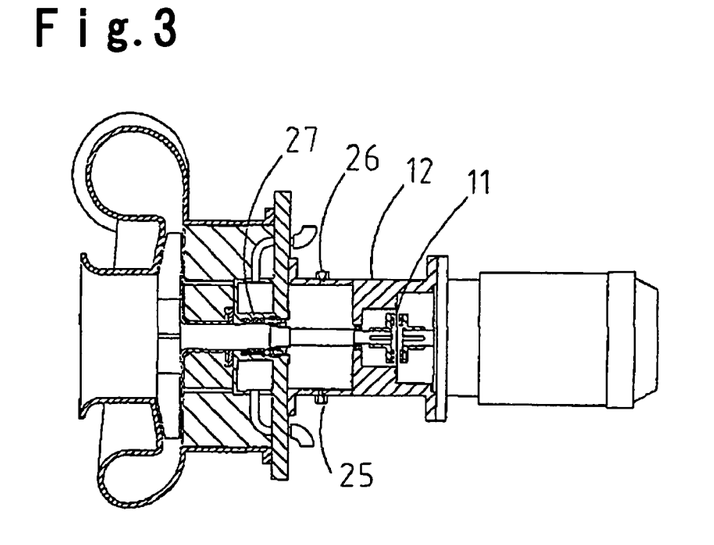
FIG. 3 is a cross-sectional view of a side of the hot-gas blowing fan according to a third embodiment of the present invention.

FIG. 3 is a cross-sectional view taken along a side plane of a third embodiment of the present invention wherein a shaft sealing device 27, a purge gas inlet 25 and a purge gas outlet 26 are added in the embodiment shown in FIG. 1. On the same parts as in FIG. 1, which are not referred to in this embodiment, those reference numerals are omitted.

In FIG. 3, the purge gas inlet 25 and the purge gas outlet 26 are provided in the enclosed space formed by the casing 12 and the non-magnetic partition wall 11.

Before the initiation of operation to the hot-gas blowing fan, the air in the enclosed space is entirely discharged outside by means of the purge gas inlet 25 and the purge gas outlet 26, and then, an inert gas is sealed in the enclosed space by sealing the purge gas inlet 25 and the purge gas outlet 26. The shaft sealing device 27 is used effectively to prevent the decrease of the amount of the inert gas as the purge gas used or to eliminate the problem caused by the mixing of the inert gas with the process gas. The inert gas sealed in the enclosed space eliminates a danger of combustion or explosion of the hot combustible gas in this space. Further, there is little possibility of dew condensation at the inside of the casing 12.

As described above, by sealing the inert gas in the enclosed space formed by the casing 12 and the non-magnetic partition wall 11, it is possible to obtain a hot-gas blowing fan of completely gas-tight, which eliminates dew condensation and a danger of combustion or explosion even in a case of using a hot combustible gas containing moisture.

In FIG. 3, a gland packing is used as the shaft sealing device 27. However, an O-ring, a labyrinth, an oil seal or the like may be used. The non-magnetic partition wall 11 is required to be of a non-magnetic material in order to prevent a reduction of the torque transmission efficiency due to an eddy current. For the non-magnetic partition wall 11 shown in FIGS. 1 to 3, bakelite was used. As the inert gas, nitrogen gas, argon gas, helium gas is preferably used.

Figure 4:
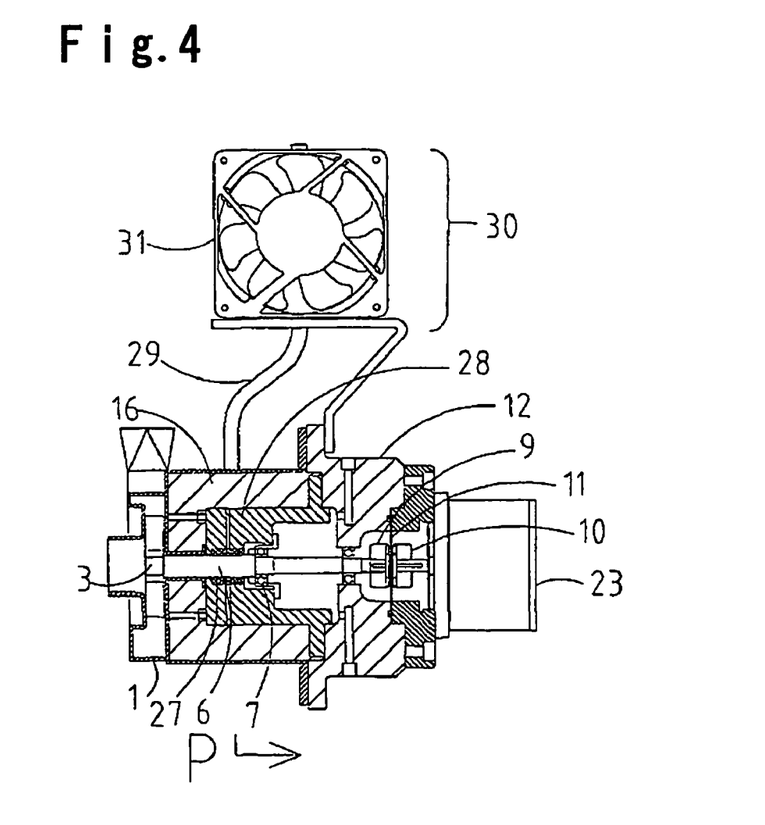
FIG. 4 is a cross-sectional view of a side of the hot-gas blowing fan according to a fourth embodiment of the present invention.
Figure 5:
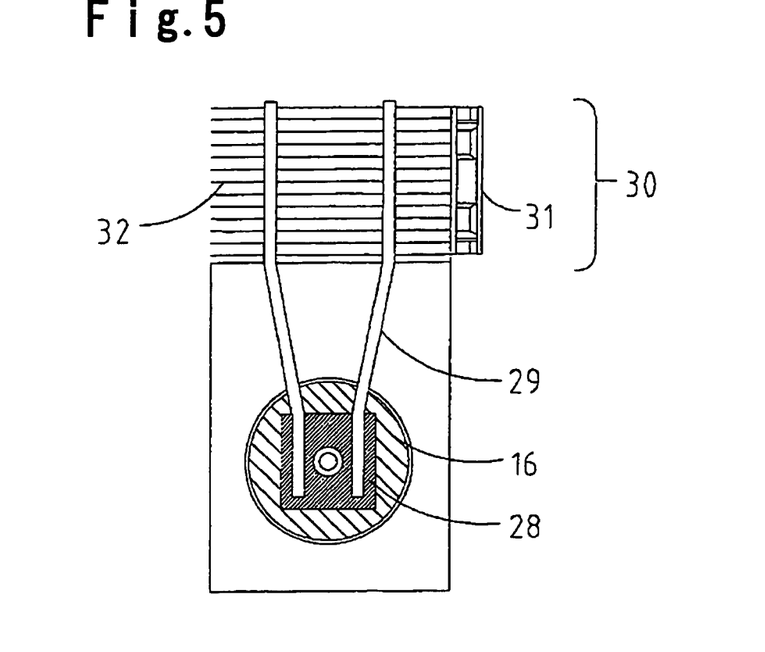
FIG. 5 is a diagram viewed from a side of P arrow mark in FIG. 4.

FIG. 4 is a cross-sectional view taken along a side plane of a fourth embodiment of the present invention wherein reference numeral 1 designates a scroll, 3 an impeller, 6 a rotating shaft, 7 a bearing, 27 a shaft sealing device, 9 a fan shaft side magnetic coupling, 10 a motor shaft side magnetic coupling, 11 a non-magnetic partition wall, 12 a casing, 16 a heat insulating layer, 28 a heat receiving portion, 29 a heat transporting portion, 30 an air cooling/radiating portion, 31 a cooling fan, respectively. FIG. 5 is a diagram viewed from a side of P arrow mark, which shows the heat receiving portion 28, the heat insulating layer 16 and the fin 32 in cross section together with the heat transporting portion 29, the air cooling/radiating portion 30 and the cooling fan 31.

The heat receiving portion 28 is disposed in coaxial with the rotating shaft 6 and in non-contact therewith in an intermediate region between the impeller 3 in direct contact with a hot gas and the bearing 7 so as to receive a heat flux to be thermally conducted via the rotating shaft 6, directly from the rotating shaft 6 by radiation and convection and to receive heat by heat conduction through the shaft sealing device 27 and the bearing 7. Further, it receives heat of a heat flux thermally conducted via the heat insulating layer 16 disposed between the impeller 3 and the bearing 7. The heat receiving portion 28 is preferably made of a material such as copper, a copper alloy, aluminum or an aluminum alloy having a high thermal conductivity. The heat transporting portion 29 serves to transfer the heat received by the heat receiving portion 28 to the air cooling/radiating portion 30 with good efficiency. For the heat transporting portion, a solid rod of copper, a copper alloy, aluminum or an aluminum alloy having a high thermal conductivity is sometimes used. In this embodiment, however, a heat pipe whose equivalent thermal conductivity is from several ten to several thousand times of the thermal conductivity of copper, of a high heat transportation capacity, was employed.

As the material for a container of heat pipe, there are copper, iron, stainless steel, aluminum and so on, and as the working liquid to be sealed in the container, there are water, naphthalene, Dowtherm-A, methanol, ammonia, acetone, Fron-12 and so on. A variety of combination thereof can be used. In this embodiment, however, copper is used as the material for the container and water is used as the sealed working liquid. The operating temperature range of the heat pipe when copper and water are used., is from 20 to 250° C. Accordingly, such combination can be used preferably in this embodiment that the temperature of the bearing should be cooled to not more than 100° C. The way of removing heat by means of the heat pipe utilizes the latent heat of evaporation of the working liquid sealed under a reduced pressure. Since the latent heat of evaporation of water used as the working liquid is 2.2 J/kg which is the largest among other kinds of working liquid, a very high heat transportation capacity can be exhibited. The number of heat pipes is determined based on calculation from a heat quantity to be withdrawn and the maximum heat transportation quantity of the heat pipes. The joining portion of the heat pipes forming the heat transporting portion 29 to the heat receiving portion 28 should be large in area as possible in order to transfer the heat quantity received by the heat receiving portion 28 to the heat pipes effectively. Further, in order to reduce the thermal contact resistance at the joining portion, each heat pipe is preferably fitted forcibly into a heat pipe fitting opening formed at the heat receiving portion 28 to increase the effective contact area. Further, when it is forcibly inserted, grease of high thermal conductivity is preferably applied to the front surface of the heat pipe. Further, it is more preferable that a pipe material for the heat pipe is previously joined to the heat receiving portion 28 by means of brazing or welding and then the working fluid such as water is sealed in the pipe.

The air cooling/radiating portion 30 is provided with a heat sink comprising a large number of fins 32. The water as the working liquid flows in the heat pipe and it evaporates at the heat receiving portion 28, the vapor is transferred to the air cooling/radiating portion 30 due to the partial pressure difference, the vapor transferred into the air cooling/radiating portion 30 condenses into water, and the condensed water returns again to the heat receiving portion 28 due to the capillary phenomenon by means of a wick structure or the like or gravity. Accordingly, it is preferable that the air cooling/radiating portion 30 is disposed at a higher position than the heat receiving portion 28 despite the presence or absence of the wick structure or the like.

Since the thermal conductivity of a water-cooling system is from 100 to 300 times as the case of an air-cooling system, the total outer surface of the fins 32 is desirably not less than from 100 to 300 times as the surface of the heat drawing portion of a conventionally used water-cooling type jacket in order to obtain the same cooling performance as the water-cooling system. The heat pipe can be bent. Accordingly, even when the air cooling/radiating portion 30 can not be disposed just above the heat receiving portion 28, the air cooling/radiating portion 30 can be disposed at relatively higher position than the heat receiving portion 28 while a sufficient heat-radiating surface is obtainable, by bending optionally the heat pipe.

The fins 32 and the heat pipe are joined so that the heat pipe penetrates the substantially central portion of each fin whereby the heat transported by the heat pipe is transferred by thermal conduction uniformly to all fins. The heat flux transported from the heat receiving portion 28 to the heat transporting portion 29 is discharged into atmosphere by the convective thermal conduction from the front surface of the fins 32 of the air cooling/radiating portion 30 via air. The cooling fan 31 may be attached to the air cooling/radiating portion 30. When the fins 32 are subjected to forcibly cooling by air, i.e., air cooling, the convective thermal conductivity is increased to increase the cooling capacity whereby the total outer surface of the fins can be reduced.

As the material for the fins 32 forming the air cooling/radiating portion 30, use of copper, a copper alloy, aluminum or an aluminum alloy having a high thermal conductivity is desirable.

In this embodiment, the hot gas temperature is 850° C. In this case, when the total outer surface of the fins was to be 0.2 $m^2$ and air of 20° C. was passed between the fins at a flow rate of 5 m/sec by using the cooling fan, the convective thermal conductivity of the surface of fin was 12 $w/m^2K$. As a result, the average temperature of the fins was 60° C. and the average temperature of the heat receiving portion was 80° C. whereby a temperature of not more than 100° C. as the initial target temperature could be achieved. In this embodiment, the heat removing quantity was 96 w in calculation. In order to further equalize the temperature distribution at the heat receiving portion 28, two heat pipes each having a maximum heat transporting quantity of 100 w were used.

As described above, although the cooling performance can be improved by using the cooling fan 31, a cooling system utilizing the natural convection of ambient air is possible without a forced air cooling system by using a cooling fan. In a case without using the cooling fan in the above-mentioned embodiment, the thermal conductivity of the surface of the fins by natural convection was 8 $w/m^2K$. As a result, the average temperature of the fins was 80° C. and the average temperature of the heat receiving portion was 100° C.

In the solid oxide fuel cell, a d.c. power source provided by the fuel cell itself is used as the power source for the driving motor 23 for the hot-gas blowing fan and the cooling fan 31. Even when the operation of the fuel cell stops suddenly for any reason and the operations of the fan driving motor and the cooling fan are stopped, the cooling by the natural convective thermal conduction continues whereby the over-heating of the bearing 7 or the shaft sealing device 27 can easily be prevented.

The dew-point of the hot gas in this embodiment is 70° C. In this embodiment, since the average temperature of the heat receiving portion is 80° C, i.e., higher than the dew-point, there is no dew condensation in the vicinity of the heat receiving portion 28.

However, when the temperature of outside air for cooling at the air cooling/radiating portion 30 is extremely low, there is possibility that the temperature of the heat receiving portion 28 is lower than the dew-point to cause dew condensation in the vicinity of the heat receiving portion 28. Then, there are possibilities that condensed water drops infiltrate into the heat insulating layer 16 to cause deterioration of the heat insulating property or water drops come to contact with the rotating shaft or impeller 3 of high-temperature to change the temperature gradient from the impeller 3 to the rotating shaft whereby an excessive thermal stress takes place in the impeller 3 or the rotating shaft 6, causing the breakage or thermal deformation of the impeller 3 or the rotating shaft 6.

This problem can be avoided by designing and manufacturing appropriately the heat pipe. Namely, the heat pipe serves to withdraw the heat generated when the working liquid sealed in the container under a predetermined reduced pressure evaporates, i.e. by the latent heat of evaporation. Accordingly, it can not be cooled to a lower temperature than the boiled point of the working liquid under a predetermined reduced pressure. Accordingly, by adjusting the pressure of the working liquid to be hermetically sealed so that the boiling point of the working liquid is higher than the dew-point, it is possible to prevent the dew condensation in the vicinity of the heat receiving portion 28.

In this embodiment, the non-magnetic partition wall 11 is disposed in a clearance between the fan shaft side magnetic coupling 9 and the motor shaft side magnetic coupling 10; the space surrounding the rotating shaft 6 is hermetically sealed from the outer field by means of the non-magnetic partition wall 11 and the casing 12, and an air cooling means is constituted by the heat receiving portion 28, the heat transporting portion 29 and the air cooling/radiating portion 30.

Namely, according to this embodiment, the hot combustible gas used in a solid oxide fuel cell can completely be sealed: It is possible to cool the bearing and so on by air-cooling; operations can be conducted with only the power source provided by the fuel cell system itself and it is unnecessary to provide a cooling water pump or a cooling means for cooling water. Thus, it is possible to obtain a hot-gas blowing fan satisfying the conditions in the application to the solid oxide fuel cell.

In the present invention, the rotating shaft and the bearing for the hot-gas blowing fan can preferably be cooled with the air-cooling means comprising the heat receiving portion 28, the heat transporting portion 29 and the air-cooling/radiating portion 30. The air-cooling means is also applicable to the cooling portion 5 of the hot-gas blowing fan shown in FIG. 1, and the water cooling means comprising the water-cooling jacket can be substituted with the air cooling means.

Figure 6:
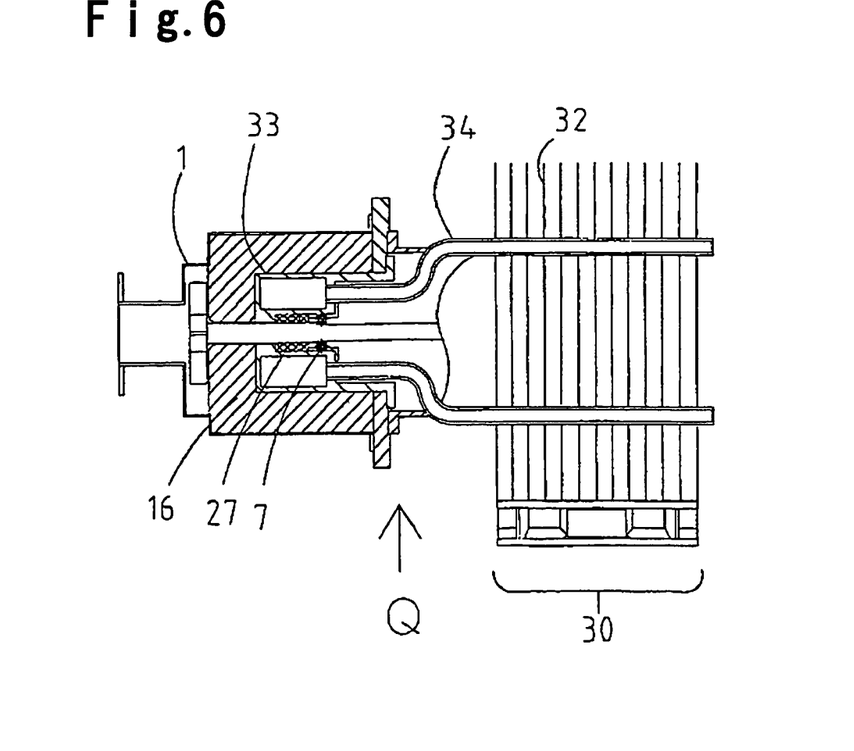
FIG. 6 is a cross-sectional view of a plane of the hot-gas blowing fan according to a fifth embodiment of the present invention.
Figure 7:
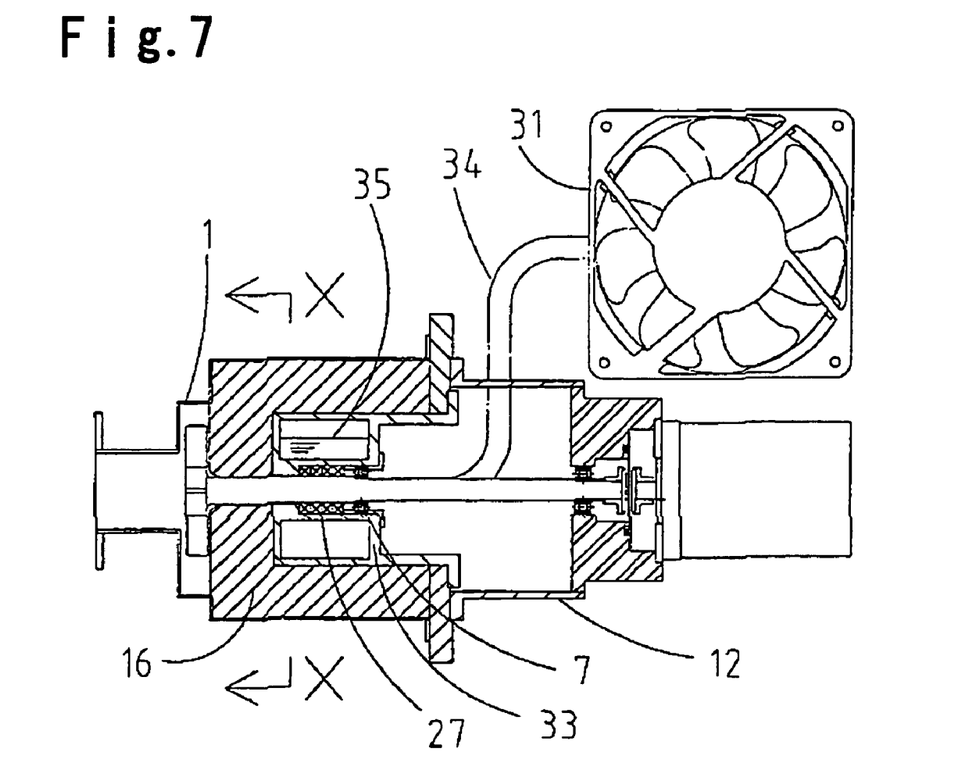
FIG. 7 is a diagram viewed from a side of Q arrow mark in FIG. 6.
Figure 8:
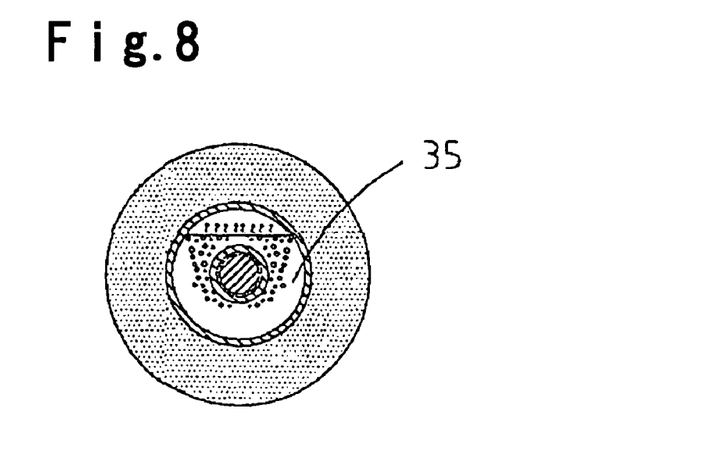
FIG. 8 is a cross-sectional view taken along a line X-X in FIG. 7.

FIG. 6 is a plane view showing a fifth embodiment of the present invention wherein a scroll 1, an evaporative portion 33, a heat transporting pipe 34, a bearing 7, a shaft sealing device 27, a heat insulating layer 16, an air cooling/radiating portion 30 disposed above the evaporative portion 33 and fins 32 are shown in cross section. FIG. 7 is a diagram viewed from an arrow mark Q in FIG. 6, in which the scroll 1, the evaporative portion 33, the bearing 7, the shaft sealing device 27, the heat insulating layer 16, a casing 12 and enclosed water were shown in cross section. Reference numeral 34 designates the heat transporting pipe and numeral 31 designates a cooling fan. FIG. 8 is a cross-sectional view taken along X-X in FIG. 7.

A space surrounded by double-cylinders is provided inside the evaporative portion 33. The heat transporting pipe 34 is a hollow pipe. The end of the pipe at the side of the air cooling/radiating portion 30 is hermetically sealed and the end thereof at the side of the evaporative portion 33 is opened to communicate with the space formed inside the evaporative portion 33. The joining portion of the heat transporting pipe 34 to the evaporative portion 33 is hermetically sealed. Namely, the space inside the evaporative portion 33 and the inside of the heat transporting pipe 34 form a unified space. In the unified space, water 35 is contained under a predetermined reduced pressure to an extent that the entirety of the inner cylindrical portion of the double cylinders is under the water whereby a so-called two-phase-fluid flowing thermo-siphon heat pipe without a wick is formed.

When the evaporative portion 33 receives a heat flux from the hot gas to show temperature rise, the water 35 under a reduced pressure evaporates at, for example, 50° C. The latent heat of evaporating water generated at this moment withdraws the heat flux received by the evaporative portion 33. The produced water vapor rises in the unified space formed by the inner portion of the evaporative portion and the inner portion of the heat transporting pipe and reaches the air cooling/radiating portion 30 to be cooled for condensation. The heat transported during the condensation is transferred to the air cooling/radiating portion 30. The water cooled and condensed in the air cooling/radiating portion 30 is returned to the evaporative portion 33 due to the gravity. The function and structure of the air cooling/radiating portion 30 are the same as those of the fourth embodiment.

In the evaporative portion 33, the inner cylinder portion of the double cylinders constitutes a housing for holding the bearing 7 and the shaft sealing device 27. Since the inner cylinder portion is immersed in the water enclosed in the evaporative portion 33, the temperature of this portion can be kept substantially uniform whereby there is no risk of generating a thermal strain and therefore, normal rotation and normal shaft sealing function can be assured.

In the fourth embodiment, the heat transporting portion 29 comprising heat pipes and the heat receiving portion 28 are not formed in one piece, and therefore, a heat resistance exists between the heat receiving portion 28 and the heat transporting portion 29. On the other hand, the fifth embodiment has the thermo-siphon heat pipes formed by unifying the evaporative portion 33 and the heat transporting pipe 34 whereby there is no heat resistance between them. Accordingly, the temperature of the evaporative portion is lower than the temperature of the heat receiving portion of the fourth embodiment.

The temperature of the evaporative portion of the fifth embodiment was measured under the same condition as the fourth embodiment. As a result, the average temperature at the evaporative portion of the fifth embodiment was 75° C. whereas the average temperature at the heat receiving portion of the fourth embodiment was 80° C.

Figure 9:
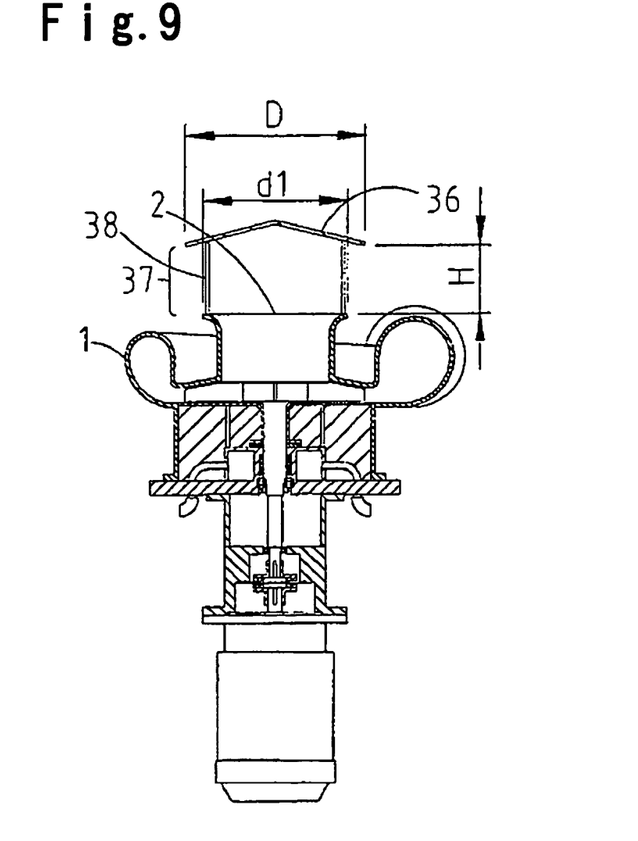
FIG. 9 is a cross-sectional view of a side of the hot-gas blowing fan according to a sixth embodiment of the present invention.

FIG. 9 is a cross-sectional view taken along a side plane of a sixth embodiment of the present invention wherein reference numeral 1 designates a scroll, 2 an inlet port of scroll, 36 a cover, 37 an apertured portion and 38 a supporter for supporting the cover, respectively.

When the hot-gas blowing fan is used for a solid oxide fuel cell, it is necessary to satisfy specifications such as air volume, air pressure and so on by driving a small-sized impeller at a high speed rather than driving a large-sized impeller at a low speed from restrictions with respect to cost and installation space. However, if a foreign matter hits the impeller rotated at a high speed, there sometimes causes the breakage or deformation of the impeller.

Accordingly, a dust collector for preventing a foreign matter having a size to cause breakage or deformation of the impeller from sucking through the inlet port 2 of the scroll, is required.

With respect to the relation between the impeller 3 driven at a high speed and a danger of the breakage or deformation thereof at the time of collision of a foreign matter, which depends on sizes, the relation can be obtained by experiments seeking the relation between a circumferential velocity of the outer diameter of the impeller, i.e., the maximum collision speed and a particle size of the foreign matter.

When the allowable particle size of a foreign matter with respect to the maximum revolution speed of a usable fan is obtained through experiments, the terminal sedimentation speed of a foreign matter having an allowable particle diameter can be obtained by calculation.

When the hot-gas blowing fan is set on the ceiling of a furnace in a vertically downward direction, the dimension of an inner diameter of the inlet port 2 of the scroll is determined so that the flowing speed of a hot gas passing through the inlet port is smaller than the terminal sedimentation speed. Then, there is little possibility of sucking a foreign matter which may cause the breakage or deformation of the impeller 3.

On the other hand, when the hot-gas blowing fan is set on the bottom of the furnace in a vertically upward direction or is set on a side wall of the furnace in a horizontal direction, it is necessary to determine so that the flowing speed of the hot gas passing through the inlet port is smaller than the terminal sedimentation speed, and at the same time, care should be taken about the falling of a foreign matter to the impeller 3.

FIG. 9 shows a case that the hot-gas blowing fan is set on the bottom of the furnace in a vertically upward direction. A hot gas is sucked from the inlet port 2 of scroll after passing through the apertured portion 37. The flowing speed Vs of the hot gas passing through the apertured portion 37 is determined depending on the capacity of sucking air of the fan and the surface area of the apertured portion.

When a foreign matter having the allowable particle diameter passes closely near the outer periphery of the cover 36 from an upper portion at the terminal sedimentation speed Ws, the distance L forcing it toward the apertured portion by the flowing speed Vs of the hot gas to the apertured portion during a time passing through the apertured portion 37 having a height H is expressed by the following formula:

$$L = H \times Vs/Ws$$

Since the dimension D of the outer diameter of the cover 36 is increased so as to satisfy the following formula with respect to the dimension d1 of the inlet port 2 of the scroll, a foreign matter having a larger particle diameter than the allowable particle diameter is not sucked. Further, a foreign matter falling directly above the inlet port 2 of the scroll does not invade into the inlet port 2:

$$(D-d1)/2 > L$$

As described above, by setting a very simple inertia dust collector comprising the cover 36 and the supporter 38 for supporting the cover 36 at the inlet port 2 of the scroll, it is possible to prevent the breakage or deformation of the impeller caused by the sucking or invasion of a foreign matter.

In this embodiment, the peripheral speed of the outer diameter of the impeller is 205 m/sec and the weight of a foreign matter which may cause the breakage of the impeller made of silicon carbide is 0.001 g according to experiments. Since the foreign matter assumed in this embodiment is a castable refractory having a specific gravity of 2.3 g/cm$^3$, the allowable particle diameter is calculated to obtain 1 mm.

The formula to calculate the terminal sedimentation speed Ws is expressed by the following formula (refer to formula (11·4) and formula (11·7), P. 170 "Hydraulic Losses in Pipes and Ducts" published by Japan Society of Mechanical Engineers, 1979):

$$Ws = \{4 \times \{(\rho s/\rho a) - 1\} \times g \times ds/3/Cd\}^{0.5}$$

$$Cd = 11/Re^{0.5}$$

where $\rho s$ represents the density of a foreign matter, $\rho a$ represents the density of a hot gas, ds represents an allowable particle diameter and Re represents Reynolds number. By substituting numerical values into the above-mentioned formulas, the terminal sedimentation speed Ws=8.1 m/sec was obtained. In this embodiment, the volume of sucked air was 15 m$^3$/min, the dimension d1 of the inlet port 2 of the scroll was 0.2 m and the height H of the apertured portion 37 was 0.1 m.

Based on the values of d1 and H, the flowing speed of the hot gas is calculated so that Vs=4 m/sec, and the value of L is calculated to be 0.05 m. Accordingly, the dimension D of the outer diameter of the cover 36 was determined to be D=0.35 m because a dimension of outer diameter of at least 0.3 m was needed.

When the hot-gas blowing fan is applied to a solid oxide fuel cell, and if an abnormal process control takes place, local combustion of the hot combustible gas may occur in the process. In such a case, flames of the local combustion contact directly the impeller, or the impeller suffers luminous flame radiation from the flames to be overheated, whereby an excessively large thermal stress creates in the impeller and the breakage or deformation of it may be caused.

The provision of the cover 36 at the inlet port 2 of the scroll prevents flames from extending to the impeller or the overheating due to the luminous flame radiation even in such case. The cover 36 used preferably is not only of a plate structure but also of a grid structure made of pipes or a heat-resistant metallic wire mesh, having a large heat capacity.

When the cover 36 is used to reduce the production of a thermal stress, the hot-gas blowing fan can be set in a vertically downward direction or a horizontal direction, both cases being effective.

Figure 10:
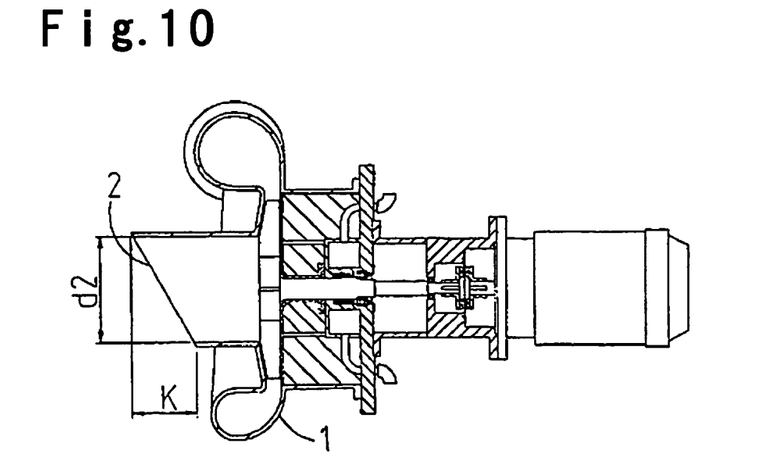
FIG. 10 is a cross-sectional view of a side of the hot-gas blowing fan according to a seventh embodiment of the present invention.
Figure 11:
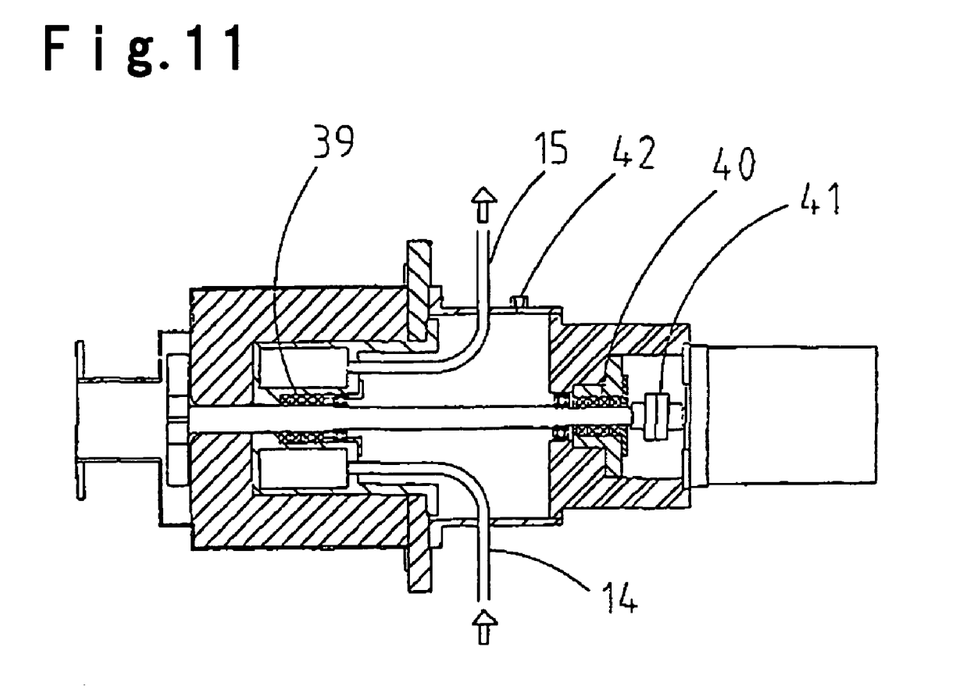
FIG. 11 is a side view of a conventional hot-gas blowing fan.

FIG. 10 is a cross-sectional view taken along a side plane of a seventh embodiment of the present invention wherein reference numeral 1 designates a scroll and numeral 2 designates an inlet port of the scroll.

FIG. 10 shows a case that the hot-gas blowing fan is set on a side wall of a furnace to be extended horizontally in the furnace. When the dimension d2 of the inner diameter of the inlet port 2 of the scroll is determined so that the flowing speed Vc of a hot gas passing through the inlet port 2 of the scroll is smaller than the allowable terminal sedimentation speed Ws and the relation of the dimension K as the difference between the length of the upper side and the length of the lower side of the inlet port 2 of the scroll is given by the following formula, there is little possibility that a foreign matter having a larger particle diameter than the allowable particle diameter is sucked into the inlet port 2 of the scroll:

$$K > d2 \times Vc/Ws$$

INDUSTRIAL APPLICABILITY

As described above, according to the present invention, it is possible to obtain a simple, completely gas-tight sealing means without using the utility other than the power source and a cooling means using cooling air. When the hot-gas blowing fan of the present invention is used for a solid oxide fuel cell, it is possible to obtain operations of high stability and high efficiency for a long term. Further, the application of the hot-gas blowing fan to various kinds of furnace for heating or firing for industrial use can be accelerated, and it contributes to improvement of thermal efficiency and quality.

The invention claimed is:

1. A hot-gas blowing fan, comprising:
a heat resisting impeller cantilevered by a rotating shaft;
a bearing attached to the rotating shaft;
a heat insulating layer disposed between the impeller and the bearing, the heat insulating layer including a first radial face that faces the impeller and an inner circumferential face that faces the rotating shaft;
a cooling portion disposed between the heat insulating layer and the bearing, and the cooling portion includes a cooling fluid to remove heat from the bearing and the rotating shaft without contacting the bearing or the rotating shaft;
a first magnetic coupling disposed on a shaft end of the rotating shaft at a side opposite to the impeller;
a second magnetic coupling configured to be mated with the first magnetic coupling and disposed on a shaft end of a driving shaft of a motor;
a non-magnetic partition wall disposed between the first magnetic coupling and the second magnetic coupling; and
a collar positioned between the first radial face of the heat insulating layer and the impeller and positioned between the inner circumferential face of the heat insulating layer and the rotating shaft, wherein the collar comprises a different material than the heat insulating layer such that the collar prevents the heat insulating layer from contaminating a process gas flowing inside the hot-gas blowing fan,
wherein a space surrounding the rotating shaft is hermetically sealed from an exterior of the hot-gas blowing fan by the non-magnetic partition wall and a casing.

2. The hot-gas blowing fan according to claim 1, wherein the hermetically sealed space is filled with an inert gas.

3. A hot-gas blowing fan, comprising:
a heat resisting impeller cantilevered by a rotating shaft;
a bearing attached to the rotating shaft;
a heat insulating layer disposed between the impeller and the bearing, the heat insulating layer including a first radial face that faces the impeller and an inner circumferential face that faces the rotating shaft;
a heat receiving portion disposed between the heat insulating layer and the bearing, and the heat receiving portion includes a cooling fluid to remove heat from the bearing and the rotating shaft without contacting the bearing or the rotating shaft;
an air cooling/radiating portion provided at an outer side of a casing;
a heat transporting portion connecting the heat receiving portion to the air cooling/radiating portion, wherein the heat transporting portion is a heat pipe; and
a collar positioned between the first radial face of the heat insulating layer and the impeller and positioned between the inner circumferential face of the heat insulating layer and the rotating shaft, wherein the collar comprises a different material than the heat insulating layer such that the collar prevents the heat insulating layer from contaminating a process gas flowing inside the hot-gas blowing fan.

4. The hot-gas blowing fan according to claim 3, wherein the heat receiving portion and the heat transporting portion are unified to form a thermo-siphon heat pipe.

5. The hot-gas blowing fan according to claim 1, wherein
the cooling portion includes a heat receiving portion disposed between the heat insulating layer and the bearing, and
the heat receiving portion is connected to an air cooling/radiating portion provided at an outer side of the casing via a heat transporting portion.

6. The hot-gas blowing fan according to any one of claims 1 to 5, further comprising:
an inertia dust collector provided at an inlet port of a scroll.

7. The hot-gas blowing fan according to claim 1, wherein the hot-gas blowing fan is configured to be attached to a solid oxide fuel cell.

8. The hot-gas blowing fan according to claim 3, wherein the hot-gas blowing fan is configured to be attached to a solid oxide fuel cell.

9. The hot-gas blowing fan according to claim 1, further comprising:
a heat insulating spacer disposed between the collar and the cooling portion to block heat transfer between the collar and the cooling portion.

10. The hot-gas blowing fan according to claim 3, further comprising:
a heat insulating spacer disposed between the collar and the heat receiving portion to block heat transfer between the collar and the heat receiving portion.

11. The hot-gas blowing fan according to claim 1, wherein a temperature of the cooling fluid is higher than a temperature of a dew-point of the process gas blown by the hot-gas blowing fan.

12. The hot-gas blowing fan according to claim 3, wherein a pressure in the heat receiving portion is adjusted so that a boiling point of the cooling fluid is higher than a dew-point of the process gas blown by the hot-gas blowing fan.

13. The hot-gas blowing fan according to claim 1, wherein the heat insulating layer is comprised of a ceramic fiber and the collar is comprised of stainless steel, heat-resistant cast steel, or ceramic.

14. The hot-gas blowing fan according to claim 3, wherein the heat insulating layer is comprised of a ceramic fiber and the collar is comprised of stainless steel, heat-resistant cast steel, or ceramic.

* * * * *